(12) United States Patent
Kim et al.

(10) Patent No.: US 7,819,571 B2
(45) Date of Patent: Oct. 26, 2010

(54) LAMP SOCKETS ASSEMBLY GUIDE, AND BACKLIGHT ASSEMBLY AND LIQUID CRYSTAL DISPLAY HAVING THE SAME

(75) Inventors: Young Nam Kim, Anseong-Si (KR); Jae Hwan Chun, Suwon-Si (KR); Jong Ho Won, Suwon-Si (KR); Kyung Rok Ko, Suwon-Si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 92 days.

(21) Appl. No.: 11/932,573

(22) Filed: Oct. 31, 2007

(65) Prior Publication Data
US 2008/0180595 A1 Jul. 31, 2008

(30) Foreign Application Priority Data
Nov. 14, 2006 (KR) .................. 10-2006-0112291
Jan. 25, 2007 (KR) .................. 10-2007-0007958

(51) Int. Cl.
*F21V 7/04* (2006.01)

(52) U.S. Cl. ............. 362/632; 362/217.14; 362/249.01; 362/633; 362/634

(58) Field of Classification Search ................ 362/217.14–217.17, 349.01, 632–634, 249.01
See application file for complete search history.

(56) References Cited

U.S. PATENT DOCUMENTS

| | | |
|---|---|---|
| 2004/0027049 A1 | 2/2004 | Lee et al. |
| 2004/0047148 A1 | 3/2004 | Kang et al. |
| 2004/0252254 A1 | 12/2004 | Koo et al. |
| 2005/0226002 A1 | 10/2005 | Aoki et al. |
| 2007/0230169 A1* | 10/2007 | Kwon et al. ............ 362/217 |
| 2008/0024068 A1* | 1/2008 | Cho et al. .............. 315/161 |
| 2008/0084696 A1* | 4/2008 | Yang et al. ............. 362/249 |

FOREIGN PATENT DOCUMENTS

| | | |
|---|---|---|
| JP | 2001-076529 | 3/2001 |
| JP | 2004-335227 | 11/2004 |
| JP | 2005-093435 | 4/2005 |
| JP | 2005-158585 | 6/2005 |
| JP | 2006-066357 | 3/2006 |
| KR | 2001-0046232 | 6/2001 |
| KR | 2005-0011143 | 1/2005 |
| KR | 2005-0019194 | 3/2005 |
| KR | 2005-0072876 | 7/2005 |
| KR | 2005-0120883 | 12/2005 |
| KR | 2006-0017105 | 2/2006 |
| KR | 2006-0023455 | 3/2006 |
| KR | 2006-0078873 | 7/2006 |
| KR | 2006-0081590 | 7/2006 |

* cited by examiner

*Primary Examiner*—Sandra L O'Shea
*Assistant Examiner*—Meghan K Dunwiddie
(74) *Attorney, Agent, or Firm*—Innovation Counsel LLP

(57) ABSTRACT

A lamp sockets guide is provided which includes a lamp sockets receiving and fastening portion for alignably receiving and retaining a plurality of lamp sockets and an inverter cover portion formed at one side of the lamp sockets receiving and fastening portion to protect an inverter, wherein the lamp sockets receiving and fastening portion and the inverter cover portion are integrally formed.

25 Claims, 10 Drawing Sheets

LAMP SOCKETS ASSEMBLY GUIDE, AND BACKLIGHT ASSEMBLY AND LIQUID CRYSTAL DISPLAY HAVING THE SAME

CROSS REFERENCE TO RELATED APPLICATIONS

Benefit of the following patent applications is claimed and there disclosures are incorporated herein by reference: Korean Patent Application No. 10-2007-0007958 filed on Jan. 25, 2007, and Korean Patent Application No. 10-2006-0112291 filed on Nov. 14, 2006.

FIELD OF INVENTION

The present disclosure of invention relates to a backlighting assembly such as used with Liquid Crystal Display (LCD) panels.

DESCRIPTION OF RELATED ART

A liquid crystal display (LCD) can display a desired image on a liquid crystal display panel by controlling light transmissivity therethrough depending on image signals applied to a plurality of electronic control switches (i.e., TFT's) arranged in a matrix form within the panel. The liquid crystal display is often not itself a light-emitting device and thus it generally needs an external light source such as a backlight. Often, a backlighting lamp unit is provided and it includes one or more lamps as well as one or more inverter circuit modules for supplying high voltage power to the one or more lamps used as the lighting sources.

However, in addition to its lamp(s) and the inverter(s), the conventional lamp unit design typically requires a number of additional independent components for alignably mounting the one or more lamps and reliably connecting them to the one or more inverter circuits. As a result of the numerous parts involved and the problem of aligning them to one another, the manufacturing cost of the backlight assembly and of the liquid crystal display is increased due to material costs and due to the manufacturing time consumed for installing all the parts in the lamp unit and lining them up for aligned interconnection with each other.

SUMMARY

The present disclosure provides a lamp sockets assembly guide (hereafter also lamp sockets guide) that is structured for aligning the positions of a plurality of received lamp sockets to each other and for protecting one or more inverter circuit modules, where the integrated functionalities of the guide help to reduce production costs due to reduction of material costs and of manufacturing time.

According to an aspect of the present disclosure, there is provided a lamp socket guide including: a lamp socket receiving portion structured for alignably receiving and retaining a plurality of lamp sockets; and an inverter covering portion integrally formed at the lamp sockets receiving portion and structured to protect an inverter module, wherein the lamp socket has a first contact portion structured to electrically connect with an electrode of a supplied lamp and the lamp socket has a second contact portion structured to receive a corresponding portion of the inverter module.

The lamp sockets fastening portions may be defined by a base plate; and a plurality of lamp socket seating grooves formed in the base plate to thereby provide spaces in which the corresponding lamp sockets are to be seated.

The inverter cover portion may include a cover plate; and a sidewall extending at a bent angle from the cover plate.

A plurality of heat radiation holes may be formed in the cover plate for allowing convection of heat from the inverter circuit module(s).

An opening portion may be formed in the cover plate.

A plurality of heat conducting protrusions may be integrally formed on the cover plate.

A first side of the cover plate of the inverter cover portion may be connected to one side of the lamp socket fastening portion, and the sidewall may be formed at each of second and third sides adjacent to the first side of the cover plate.

The lamp may be a cold cathode fluorescent lamp or an external electrode fluorescent lamp.

According to an aspect of the disclosure, there is provided a lamp unit, including: a plurality of lamps; a plurality of lamp sockets each having a contact portion electrically connected to an electrode of the lamp; a lamp sockets assembly guide for guiding assembly and affixing positions of the lamp sockets; and an inverter module including a substrate and an inverter mounted on the substrate to supply power to the lamps, wherein the lamp sockets guide includes a lamp sockets receiving/fastening portion (a lamp sockets receiving and fastening portion) for alignably receiving and retaining a plurality of supplied lamp sockets, and an inverter cover portion integrally formed at one side of the lamp socket fastening portion to protect the inverter.

The lamp sockets receiving/fastening portion may include a base plate; and a plurality of lamp socket seating grooves formed in the base plate to provide spaces into which the lamp sockets may be alignably seated.

The inverter cover portion may include a cover plate; and a sidewall bent from the cover plate.

The substrate of the inverter module may be fastened to the lamp socket in a sliding manner.

The substrate of the inverter module may be connected to the contact portion of the lamp socket by soldering.

The inverter module may be disposed in the inverter cover portion of the lamp socket guide.

A plurality of heat radiation holes may be formed in the cover plate.

The cover plate may be formed with an opening portion in correspondence to the inverter in shape and size.

A plurality of heat conducting protrusions may be formed on the cover plate.

A first side of the cover plate of the inverter cover portion may be connected to one side of the lamp socket fastening portion, and the sidewall may be formed at each of second and third sides adjacent to the first side of the cover plate.

Recesses may be formed in the second and third sides of the cover plate, respectively.

The lamp sockets receiving/fastening portion may be disposed between a plurality of the lamp sockets.

According to a further aspect of the present disclosure, there is provided a backlight assembly, including: a lamp unit having a lamp, a lamp socket with a contact portion electrically connected to an electrode of the lamp, a lamp socket guide for guiding a position of the lamp socket, and an inverter module for supplying power to the lamp; and a chassis having a receiving space in which the lamp unit is mounted, wherein the lamp socket guide includes a lamp socket fastening portion for preventing a lamp socket from floating; and an inverter cover portion formed at one side of the lamp socket fastening portion to protect the inverter, the lamp socket fastening portion and the inverter cover portion being integrally formed.

A through hole may be formed in the chassis.

The lamp socket may pass through the through hole and be disposed on a first surface of the chassis, and the lamp socket guide and the inverter module may be disposed on a second surface opposite to the first surface.

DETAILED DESCRIPTION

Hereinafter, various embodiments in accordance with the disclosure will be described in detail with reference to the accompanying drawings.

Figure 1A:
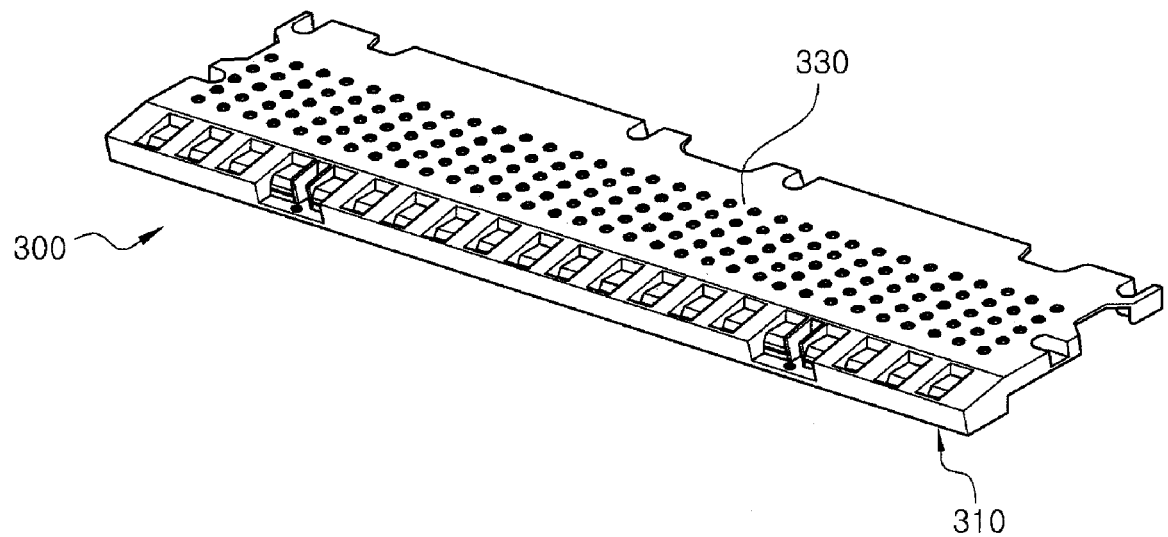
FIGS. 1A and 1B are front and rear perspective views respectively illustrating a lamp socket guide according to a first embodiment.
Figure 1B:
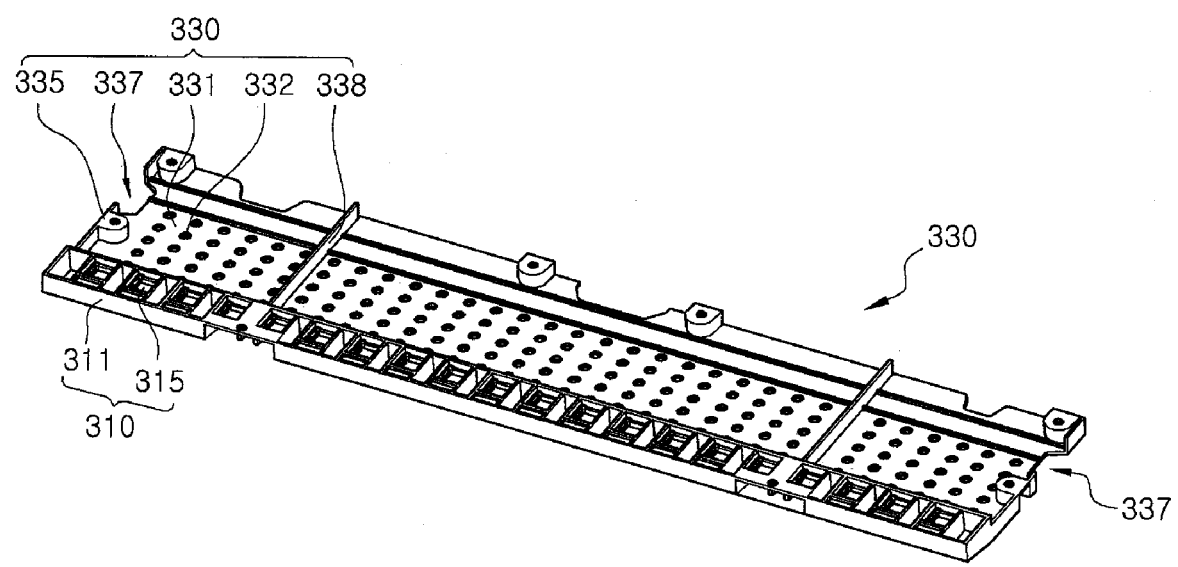

FIGS. 1A and 1B are top and bottom perspective views respectively illustrating a first lamp socket guide 300 according to a first embodiment.

Referring to FIGS. 1A and 1B, the lamp socket guide 300 includes a lamp sockets receiving/fastening portion 310 and an inverter module covering portion 330. The lamp sockets receiving/fastening portion 310 and the inverter covering portion 330 are integrally formed with each other to define a monolithic structure for example by way of a unitary plastic or metal mold.

In order to alignably install a plurality of lamp sockets (not shown in FIGS. 1A-1B, see 200 of FIG. 4) there into, the lamp sockets receiving/fastening portion 310 includes a base plate 311, and a plurality of lamp socket seating grooves 315 alignably defined in the base plate 311 and spaced apart from one another to provide spaces in which the lamp sockets (see 200 of FIG. 4) are to be seated.

Figure 5A:
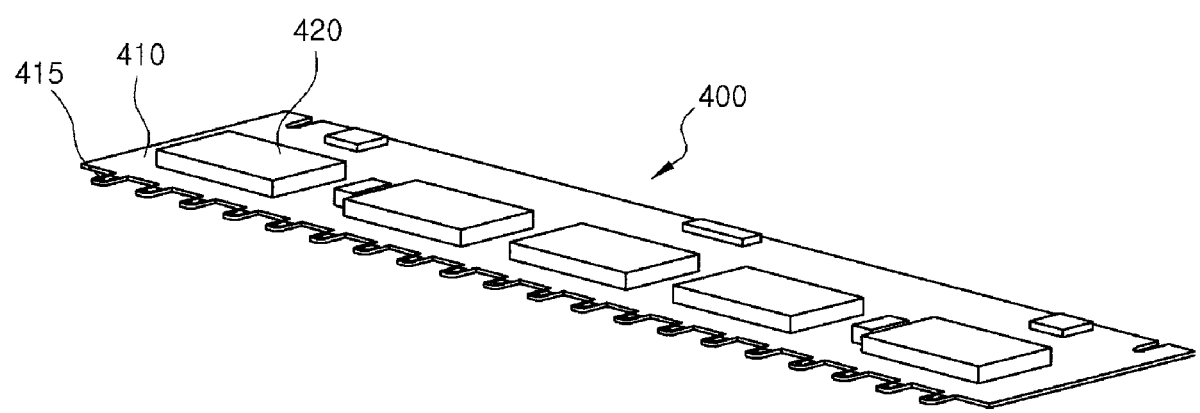
Figure 5B:
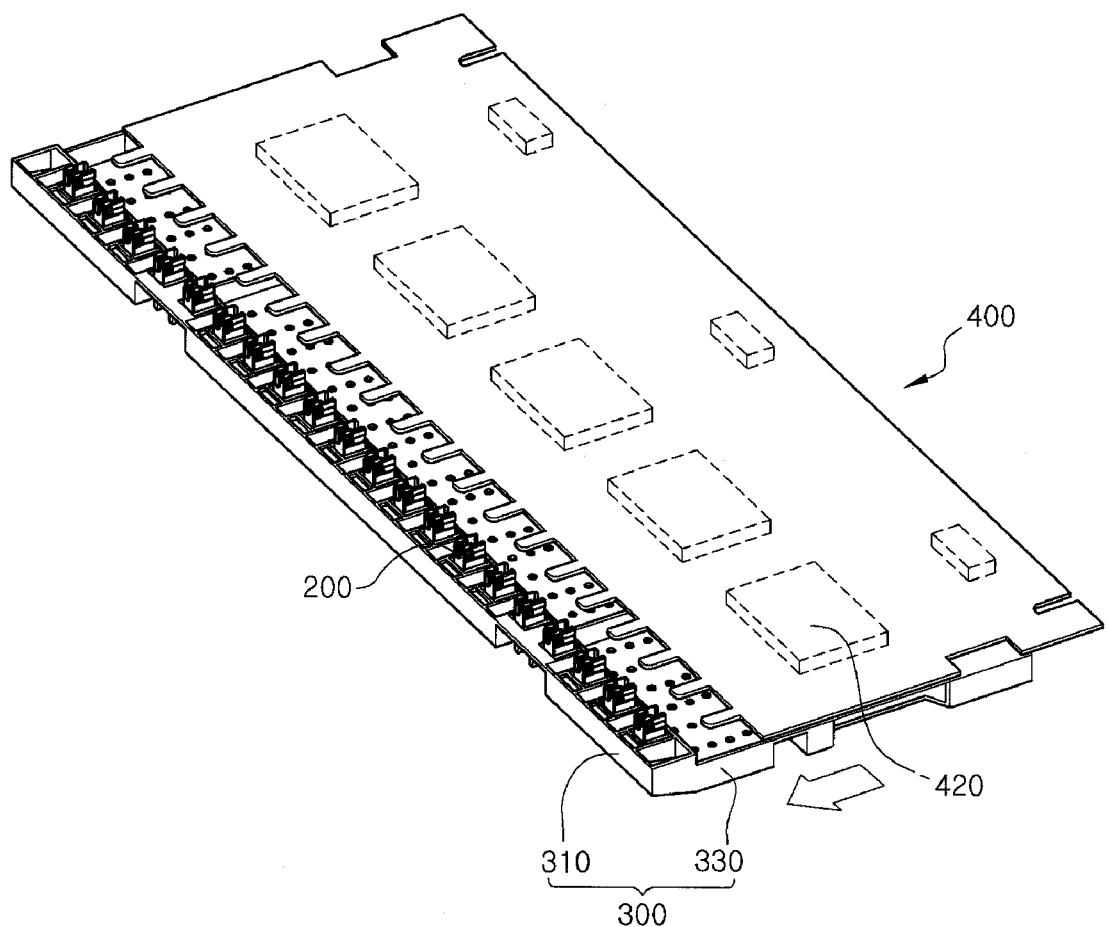

The inverter cover portion 330 extends outwardly and integrally from one side of the lamp sockets receiving/fastening portion 310 and includes a cover plate 331 and sidewalls 335 extending at an angle from the cover plate 331 in order to protect one or more inverter modules (not shown) and other circuit components (not shown in FIGS. 1A-1B, see FIG. 5B instead). In addition, a plurality of heat radiation holes 332 are defined through the cover plate 331 of the inverter cover portion 330, to thereby facilitate emission of heat generated in the inverters by way of air convection for example.

The configuration of the lamp socket guide 300 will now be described in yet more detail. Still referring to the above figures, the base plate 311 of the lamp sockets receiving/fastening portion 310 is formed in a rectangular shape as shown in the illustration. The lamp sockets seating grooves 315 in the base plate 311 are formed with corresponding sizes and shapes corresponding in sizes and shapes of predefined lamp sockets so that the lamp sockets can be snugly and alignably inserted into the grooves 315 and fixed thereto. Generally, in case of a direct type backlighting assembly, a plurality of lamps (see 100 of FIG. 6B) are to be arranged in the backlighting assembly to be spaced apart from each other and accordingly the plurality of lamp socket seating grooves 315 are also formed to be similarly spaced apart from each other.

The cover plate 331 of the inverter cover portion 330 is formed at one side of the lamp sockets receiving/fastening portion 310, i.e., at one side of the base plate 311. Similarly to the base plate 311, the cover plate 331 is formed in a generally rectangular shape as shown. A first side of the cover plate 331 is connected to one side of the base plate 311, and the sidewalls 335 extend at substantially vertical angles from the cover plate 331 to define second and third sidewalls adjacent to the first sidewall 311 of the cover plate 331, respectively. As a result of there being three sidewalls surrounding it, a receiving space for receiving an inverter module (not shown, see 400 of FIG. 5A) is defined in the inverter cover portion 330. In addition, an opening is formed at a fourth side of the cover plate 331, i.e., at a portion opposite to the lamp socket fastening portion 310 where a fourth sidewall might have been, but is not formed. The inverter module can be sliding-wise mated with, or separated from electrical connection with the lamp sockets (not shown) by having a part of the inverter module reciprocate through the opening.

In order to allow a technician to easily separate the inverter module from the lamp socket guide 300, recesses 337 are formed at sides of the inverter cover portion 330, i.e., the second and third sides of the cover plate 331. The inverter module is exposed through the recesses 337 and can thus be pulled out with fingers extended into the recesses 337, and thus, easily separated from the lamp sockets.

Partitions or ribs 338 may be provided for supporting the cover plate 331 and may be arranged on the cover plate 331 as shown. The partitions 338 are formed to extend in the same direction as the second and third sidewalls 335.

Figure 6A:
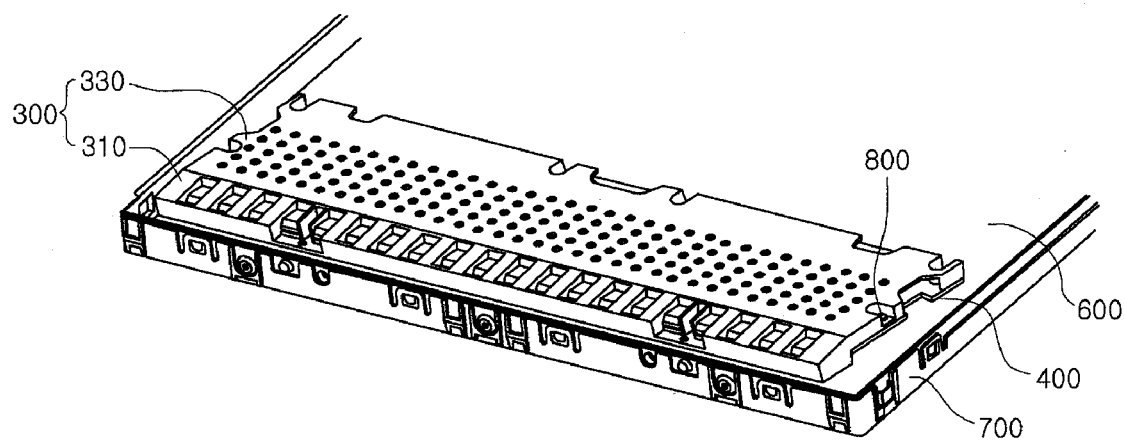
FIGS. 6A and 6B are rear and front perspective views respectively illustrating a backlight assembly having the lamp socket guide according to the first embodiment.
Figure 6B:
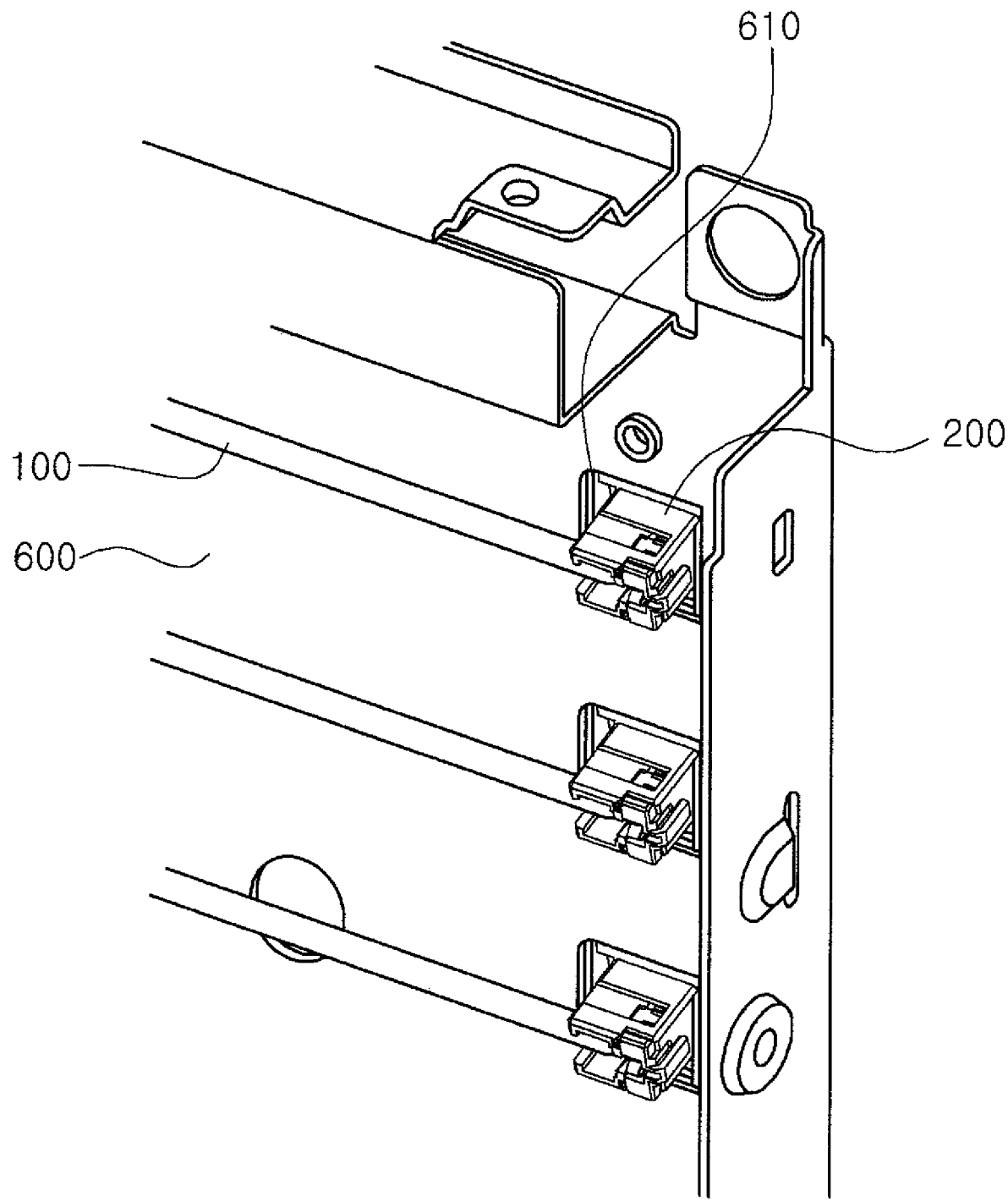

FIGS. 2 to 5B are schematic views illustrating a possible process of assembling the lamp sockets (200) and the inverter module (400) into the lamp sockets guide (300) according to the first embodiment. FIGS. 6A and 6B are rear and front perspective views respectively illustrating an assembled backlight assembly having the lamp sockets guide according to the first embodiment of the present disclosure.

Figure 2:
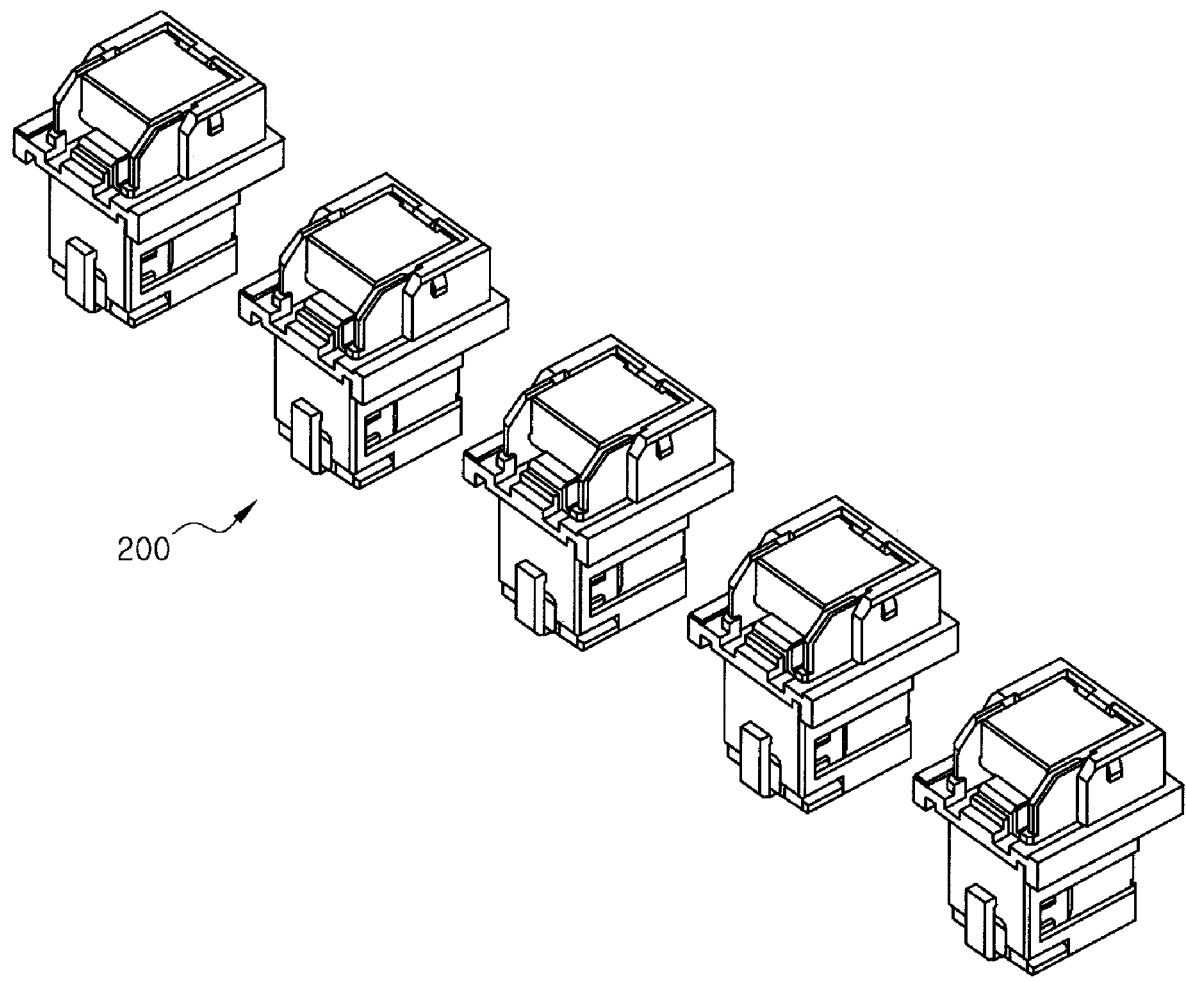
FIGS. 2 to 5B are schematic views illustrating a process of assembling a lamp socket and an inverter module in the lamp socket guide according to the first embodiment.
Figure 3A:
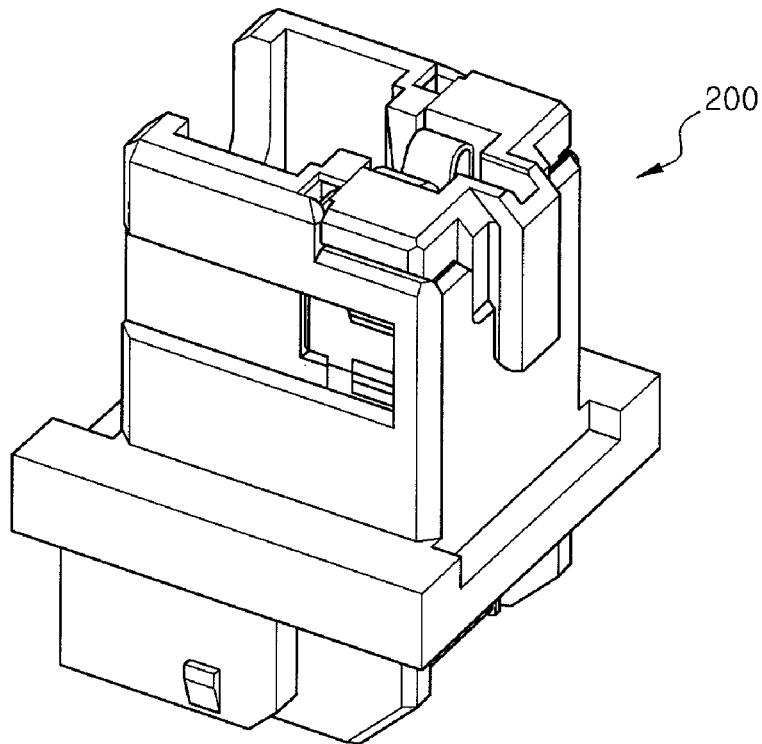
Figure 3B:
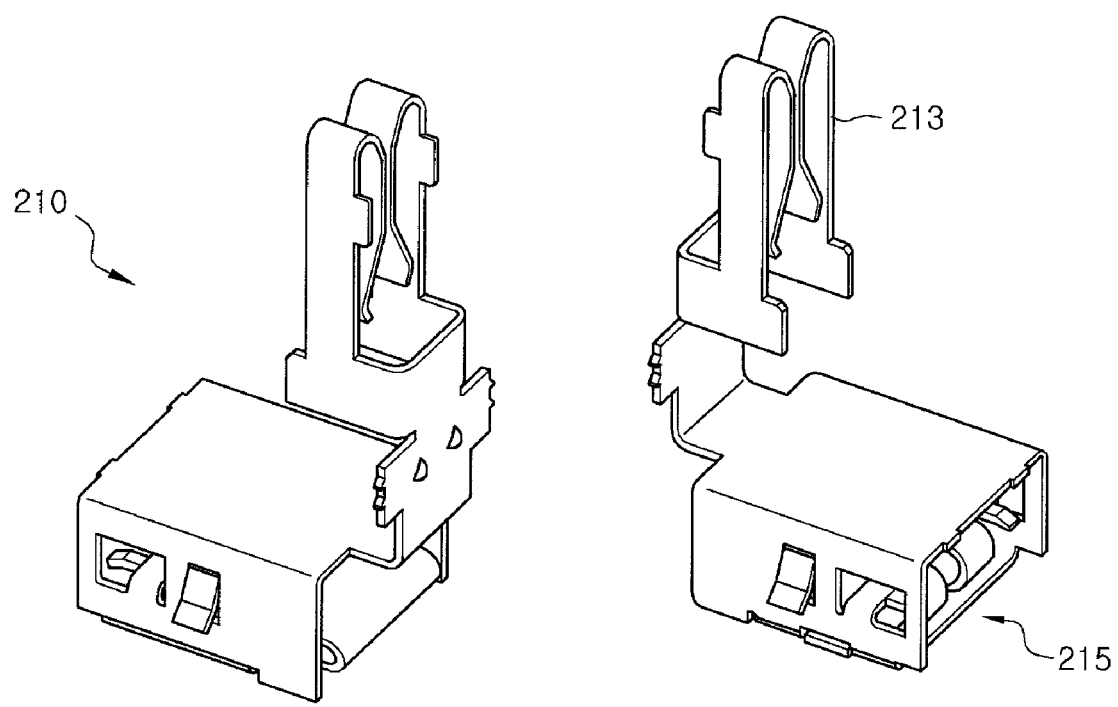
Figure 3C:
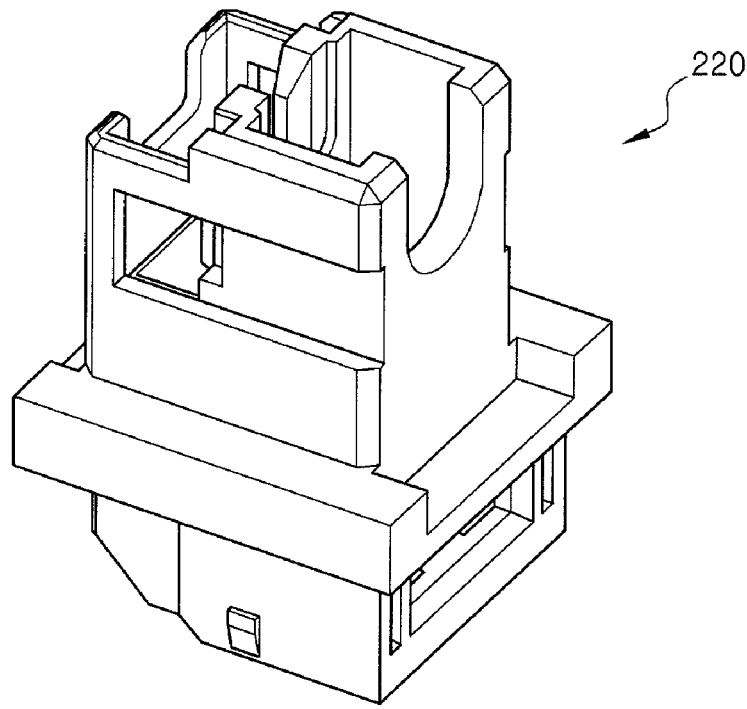
Figure 3D:
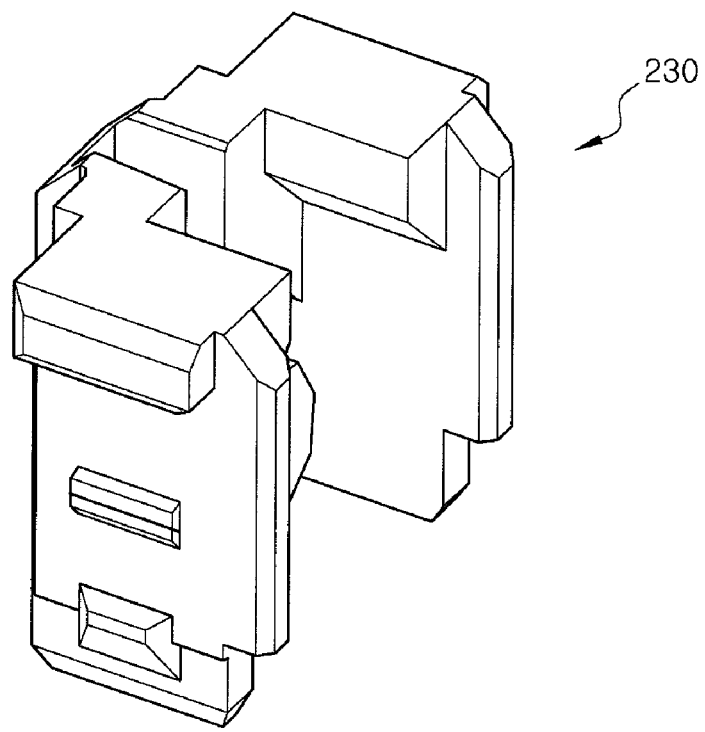

Referring to FIGS. 2 to 3D, each of the lamp sockets 200 (FIG. 3A) includes a contact terminal 210 (FIG. 3B), a housing 220 (FIG. 3C) and a cover 230 (FIG. 3D). Each lamp socket 200 removably fixes to a corresponding lamp (not shown, see FIG. 6B) and serves as a connector for supplying power to the lamp.

In general, a cold cathode fluorescent lamp (CCFL) or an external electrode fluorescent lamp (EEFL) may be used as the lamp. The CCFL includes a lamp tube, and typically has electrodes integrally formed around both ends of the lamp tube. When power is applied from the outside through the electrodes, invisible light (i.e., UV light) is generated when a discharge gas in the lamp tube is changed into plasma and the invisible light excites a phosphor layer, thereby emitting visible light to the outside. Contrasting to the CCFL, the EEFL has electrodes formed to extend outside or beyond the glass tube.

The contact terminal 210 (FIG. 3B) includes a first clip-like contact 213 into which the electrode of the CCFL or EEFL is removably fastened, and a second clip-like contact 215 into which a substrate protrusion of the inverter module (not shown, see 400 of FIG. 5A) is removably fastened. The contact terminal 210 is coupled to the housing 220 and the cover 230.

Figure 4:
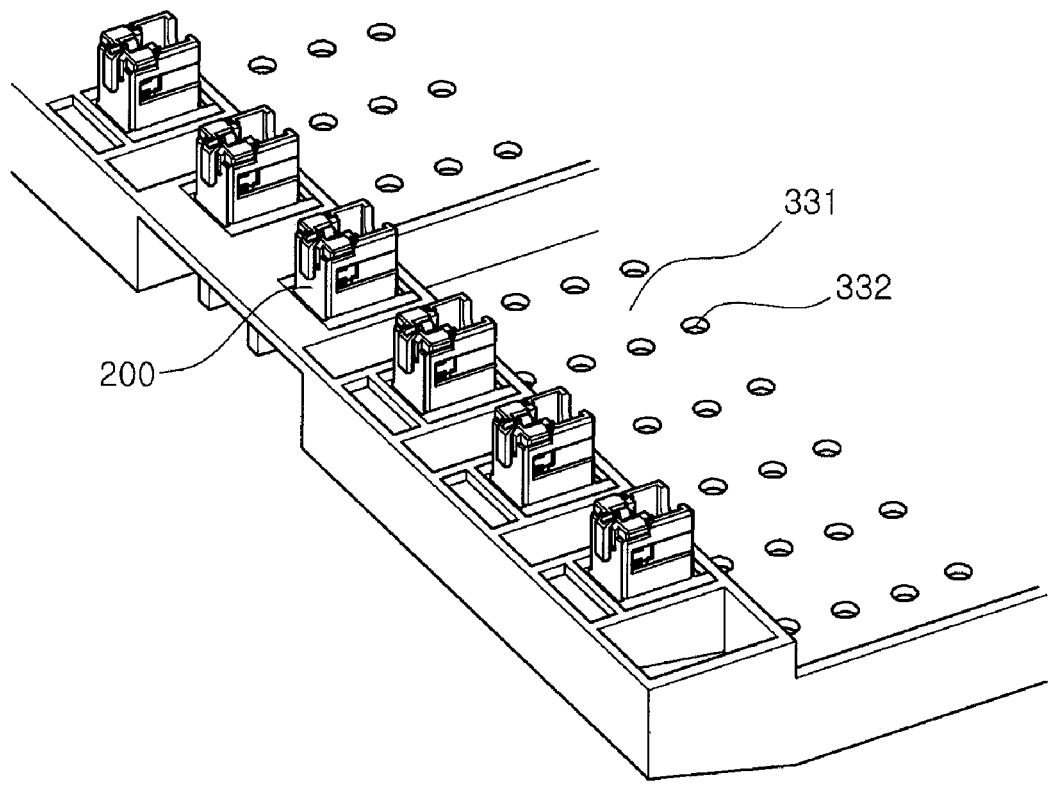

As shown in FIG. 4, the lamp sockets 200 are seated into the grooves of the lamp sockets receiving/fastening portion 310 of the lamp socket guide 300. That is, the lamp sockets 200 are respectively inserted into and coupled by press fitting and/or otherwise (adhesively) to the lamp socket seating grooves 315 formed on the base plate 311 of the lamp sockets receiving/fastening portion 310. At this time, openings (not directly shown) are formed at sides of the lamp socket seating grooves 315 so that the second contact 215 of each lamp socket 200 is exposed to receive a corresponding connection protrusion 415 of the inverter module (FIG. 5A).

Referring to FIGS. 5A and 5B, the inverter module 400 includes a substrate 410, and one or a plurality of inverter circuits 420 mounted on the substrate 410 to supply power to the lamps. A printed circuit board (PCB) with circuit patterns formed thereon can be used as the substrate 410. Connector protrusions 415 are formed at one side of the substrate 410 and typically have printed circuit traces on them extending from respective connections with packaging pins (or ball grids) of the inverter circuits 420.

The inverter module 400 may be fastened mechanically and electrically to the lamp sockets 200 in a sliding manner as indicated in FIG. 5B. That is, in order to fasten the substrate 410 of the inverter module 400 to the lamp sockets 200 coupled to the lamp socket guide 300, the substrate 410 is moved in the arrow direction as shown in FIG. 5B, and the protruding connector tabs 415 of the substrate 410 are thereby inserted into and make electrical contact with respective ones of the second contacts 215 of the lamp sockets 200, where the second contacts 215 are exposed via second openings (not directly shown in FIG. 5B) formed through sidewalls of the lamp socket seating grooves 315. At this time, the inverter circuits 420 (i.e., encapsulated prismatic modules) are disposed so that major top surfaces thereof face the inverter cover portion 330 of the lamp socket guide 300 and so that heat from the major top surfaces can dissipate though the convection holes 330.

Although in this embodiment, the substrate of the inverter module is fastened to the contact portions of the lamp sockets, i.e., the second contacts in a sliding manner; the present disclosure is not limited to this one contacting and connection making method. That is, the substrate of the inverter module may be optionally further connected to the contact portions of the lamp sockets 200 by means of soldering for example.

FIGS. 6A and 6B illustrate a backlighting assembly with a lamps unit installed in a receiving member (600) such as a light reflecting portion of an LCD panel. The lamps unit includes a plurality of lamps 100 (FIG. 6B), the plurality of lamp sockets 200 which removably clasp the lamps 100, the lamp socket guide 300 (FIG. 6A) which is structured to guide installation of the lamp sockets 200 in an aligned way and to provide protection for the inverter module 400, and the inverter module 400. The receiving member may include a light-reflecting metal chassis 600 for providing a receiving space for receiving the lamps 100, and an outer mold frame (i.e., plastic) fastened to the chassis 600.

A portion of the lamp unit except for the lamps and a portion of the lamp sockets shown in FIG. 6B (i.e., the other portion of the lamp sockets coupled to the lamp socket guide and the inverter module) is disposed on the rear surface of the chassis and then fastened to the chassis 600. At this time, the lamp socket guide 300 and the substrate 410 of the inverter module among the lamp unit are fastened to the chassis 600 by means of a screw inserted into a fastening recess 800 (FIG. 6A). In this embodiment, screws may be used in the fastening portion 800. However, the present invention is not limited thereto. That is, a variety of other fastening structures such as hooks or rivets can be used.

Meanwhile, in this embodiment, the fastening portion 800 fixes the lamp socket guide 300 and the substrate 410 of the inverter module 400 to the chassis 600. However, the fastening portion 800 may fix only the lamp socket guide 300 to the chassis 600, and the substrate 410 may be disposed in the inverter cover portion 330 of the lamp socket guide 300.

Through holes 610 (FIG. 6B) are formed in the chassis 600. The exposed portions of the lamp sockets 200 fixed to the lamp socket fastening portion 310 pass through the through holes 610 and are disposed on a first surface of the chassis 600, i.e., a receiving surface, and the lamp socket guide 300 and the inverter module (not shown) are disposed on a second surface opposite to the first surface. The lamps 100 are seated in the lamp sockets 200 and fixed thereto as shown.

Figure 7A:
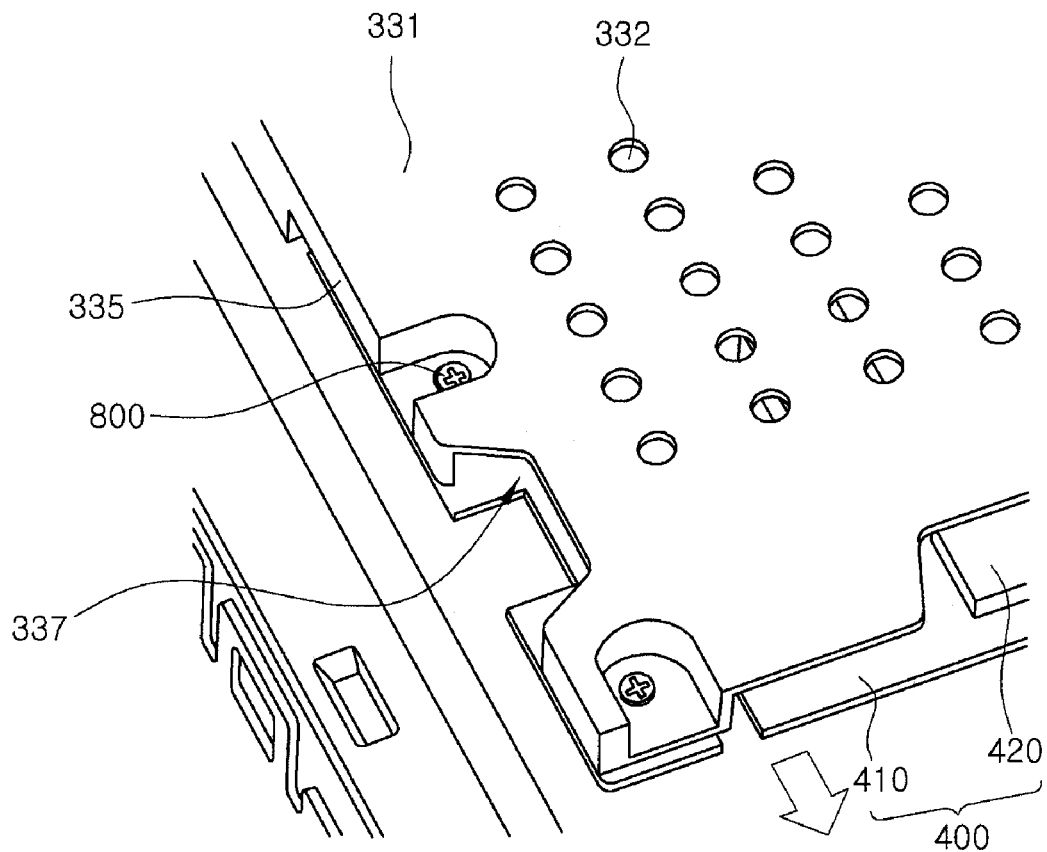
FIGS. 7A and 7B are schematic views illustrating a process of separating the inverter module disposed in the lamp socket guide therefrom.
Figure 7B:
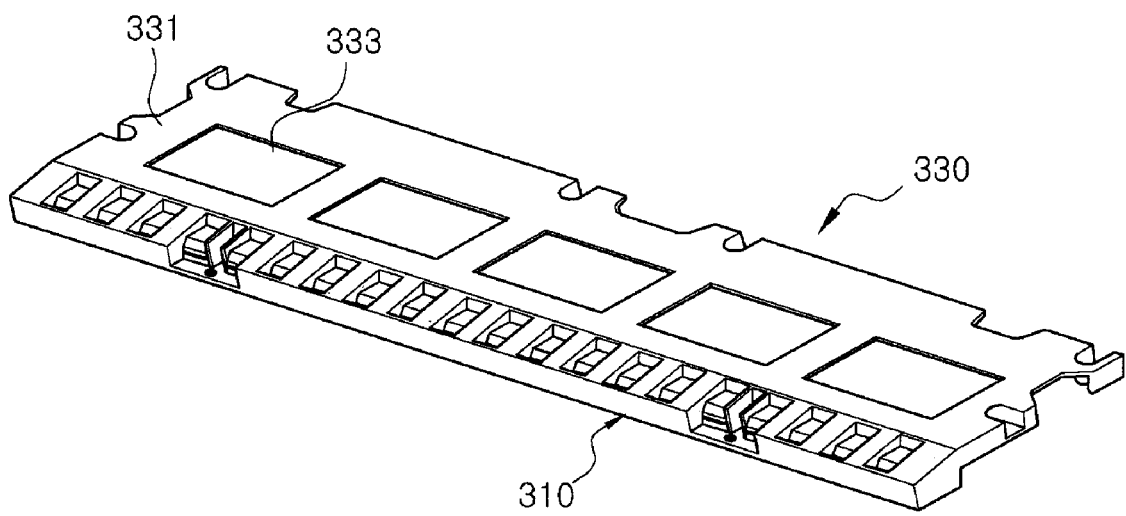

FIGS. 7A and 7B are schematic views illustrating a process which may be used for separating the inverter module from the lamp socket guide.

Referring to FIGS. 7A and 7B, after the lamp unit is installed to the chassis 600, the inverter module 400 may need to be separated to rework (repair) the inverter module. To this end, the recesses 337 are formed in the sides of the inverter cover portion 330 of the lamp socket guide 300, i.e., the second and third sides of the cover plate 331, respectively.

When the fastening portion 800 fixes the lamp socket guide 300 and the substrate 410 of the inverter module 400 to the chassis 600, the lamp socket guide 300 and the substrate 410 of the inverter module 400 are first separated from the chassis 600 by releasing the fastening portion 800. Thereafter, the substrate 410 of the inverter module 400 exposed through the recesses 337 is pulled out in an arrow direction, and thus can be easily separated.

On the other hand, if the fastening portion 800 fixes only the lamp socket guide 300 to the chassis 600, the substrate 410 of the inverter module 400 exposed through the recesses 337 is pulled out in the arrow direction without releasing the fastening portion 800, and thus can be easily separated.

Figure 8:
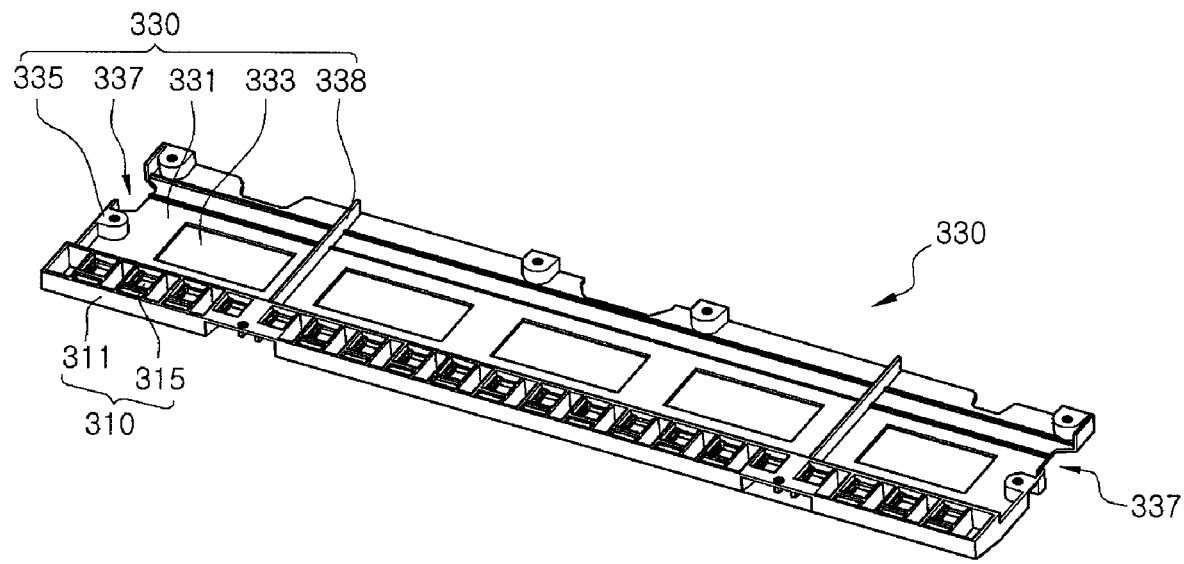
FIG. 8 is a rear perspective view illustrating a lamp socket guide according to a second embodiment.
Figure 9:
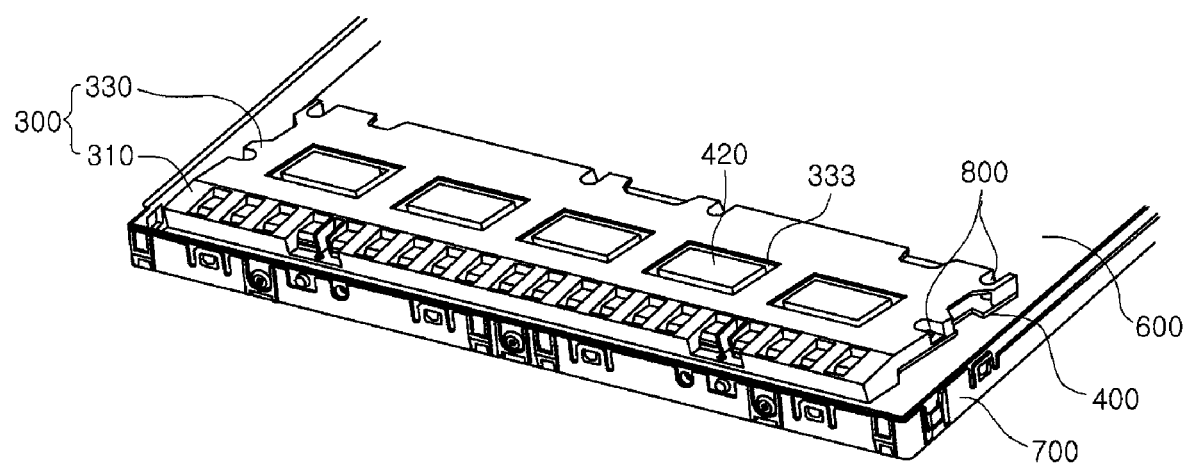
FIG. 9 is a rear perspective view illustrating a backlight assembly having the lamp socket guide according to the second embodiment.

FIG. 8 is a rear perspective view illustrating a lamp socket guide according to a second embodiment, and FIG. 9 is a rear perspective view illustrating a backlight assembly having the lamp socket guide according to the second embodiment.

The second embodiment shown in FIGS. 8 and 9 is almost identical to the first embodiment except for the shape of the inverter cover portion of a lamp socket guide. Therefore, the following description will be focused on such differences.

Referring to FIGS. 8 and 9, a lamp socket guide 300 includes a lamp sockets receiving/fastening portion 310 and an inverter cover portion 330. The lamp sockets receiving/fastening portion 310 and the inverter cover portion 330 are integrally formed with each other.

The inverter cover portion 330 is formed at one side of the lamp sockets receiving/fastening portion 310, and includes a cover plate 331 and sidewalls 335 bent from the cover plate 331. In addition, large opening portions 333 (bigger in area than the top major surfaces of the inverter packages) are formed in the cover plate 331 of the inverter module 330, to thereby facilitate emission of heat generated in inverters 420 by way of convection for example. At this time, the opening portions 333 are formed corresponding in size and shape to the inverters 420, to partially expose the inverters 420. As a result, a backlight unit can be formed to be slim in thickness.

Figure 10A:
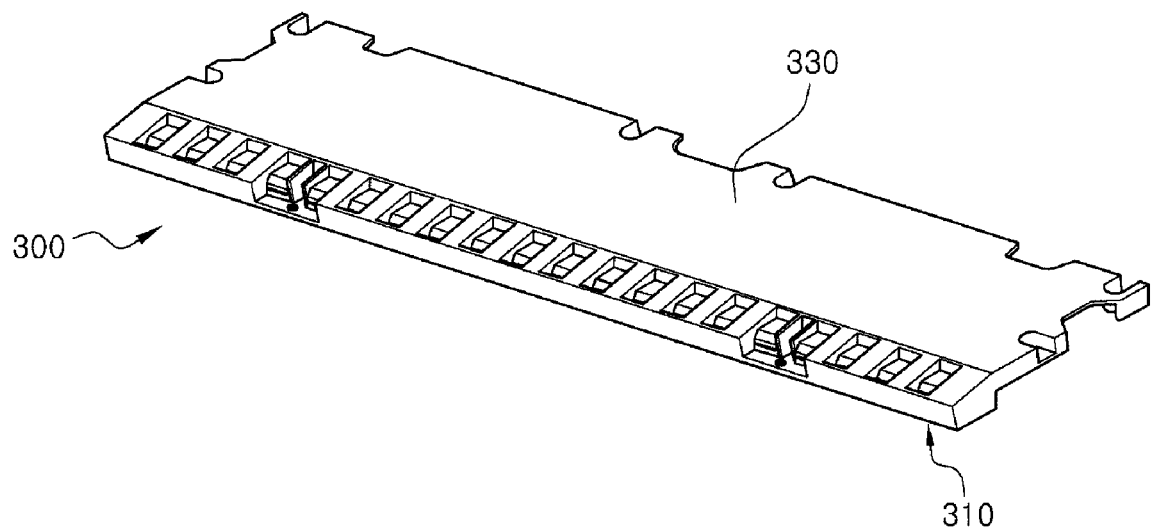
FIGS. 10A and 10B are front and rear perspective views respectively illustrating a lamp socket guide according to a third embodiment.
Figure 10B:
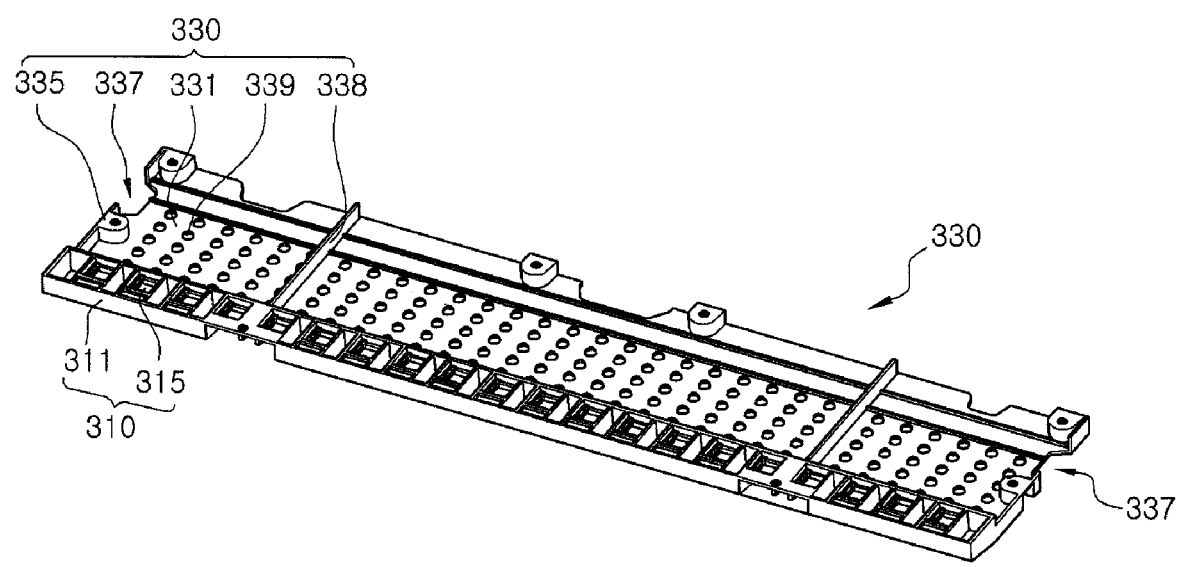

FIGS. 10A and 10B are front and rear perspective views respectively illustrating a lamp socket guide according to a third embodiment.

Referring to FIGS. 10A and 10B, a lamp socket guide 300 includes a lamp sockets receiving/fastening portion 310 and an inverter cover portion 330. The lamp sockets receiving/fastening portion 310 and the inverter cover portion 330 are integrally formed with each other. In order to fix the lamp sockets (not shown), the lamp sockets receiving/fastening portion 310 includes a base plate 311, and lamp socket seating grooves 315 formed on the base plate 311 to provide spaces in which the lamp sockets are seated.

The inverter cover portion 330 is formed at one side of the lamp socket fastening portion 310. Also, in order to protect inverters (not shown) and circuit components (not shown), the inverter cover portion 330 includes a cover plate 331, and sidewalls 335 bent from the cover plate 331.

A plurality of heat radiation protrusions 339 (e.g., metal studs) are formed on the cover plate 331 of the inverter cover portion 330. At this time, the plurality of heat radiation protrusions 339 are formed on the cover plate 331 facing the inverters for thermally conductive contact with the inverters, and these may be formed integrally with a thermally conductive version of the cover plate 331. Since the inverters are brought into contact with the plurality of heat radiation protrusions 339, heat generated from the inverters can pass through the heat radiation protrusions 339 and are directly discharged through the thermally conductive cover plate 331.

As discussed above, according to the present disclosure, the lamp sockets receiving/fastening portion and the inverter cover portion are integrally formed for example by single unit molding (metal or plastic), whereby the lamp socket guide can be simplified in structure. As a result, the material costs of the lamp socket guide can be reduced. Moreover, the production cost of the backlighting assembly can also be reduced by decreasing the number of assembly processes and the manufacturing time involved.

The above descriptions are merely exemplary embodiments of a lamp socket guide, and a lamp unit and a backlight assembly having the same according to the present disclosure. Those skilled in the art can make various modifications and changes thereto after reading this disclosure while not departing from the scope and spirit of the disclosure.

What is claimed is:

1. A lamp socket guide, comprising:
   a lamp sockets receiving and fastening portion structured for alignably receiving and retaining a plurality of lamp sockets; and
   an inverter covering portion integrally combined with the lamp sockets receiving and fastening portion so that the combination defines a monolithic structure, wherein the inverter covering portion is and structured to protect a supplied inverter module by protectively covering circuitry of the inverter module,
   wherein each of the lamp sockets that are receivable by and retainable by said lamp sockets receiving and fastening portion has a first contact portion structured to electrically connect with an electrode of a supplied lamp and wherein each of the lamp sockets further has a second contact portion structured to receive a corresponding portion of the inverter module.

2. The lamp socket guide as claimed in claim 1, wherein the lamp sockets receiving and fastening portion comprises:
   a base plate; and
   a plurality of lamp socket seating grooves formed in the base plate to provide respective receiving spaces into which respective ones of the lamp sockets are seated.

3. The lamp socket guide as claimed in claim 1, wherein the inverter covering portion comprises:
   a cover plate; and
   a sidewall bent from the cover plate.

4. The lamp socket guide as claimed in claim 3, wherein a plurality of heat radiation holes are defined through the cover plate.

5. The lamp socket guide as claimed in claim 3, wherein the protectively covered circuitry of the inverter module includes a plurality of inverter packages each having a respective major surface and wherein a plurality of large cooling openings are formed in the cover plate to align over the major surfaces of the inverter packages, each of the large cooling openings being larger in area than the area of the corresponding major surface of the inverter package positioned in the area of the corresponding large cooling opening.

6. The lamp socket guide as claimed in claim 3, wherein a plurality of heat conducting protrusions are formed on the cover plate.

7. The lamp socket guide as claimed in claim 3, wherein a first side of the cover plate is connected to one side of the lamp sockets receiving and fastening portion, and the sidewall is formed at each of second and third sides adjacent to the first side of the cover plate.

8. The lamp socket guide as claimed in claim 3, wherein the lamp is a cold cathode fluorescent lamp or an external electrode fluorescent lamp.

9. A backlight assembly, comprising:
   a lamp unit including a lamp, a lamp socket having a contact portion electrically connected to an electrode of the lamp, a lamp socket guide for guiding a position of the lamp socket, and an inverter module for supplying power to the lamp; and
   a chassis having a receiving space in which the lamp unit is mounted,
   wherein the lamp socket guide comprises:
      a lamp socket fastening portion for preventing a lamp socket from floating; and
      an inverter cover portion integrally combined with and formed at one side of the lamp socket fastening portion so that the combination defines a monolithic structure, wherein the inverter cover portion is structured to protect the inverter.

10. The backlight assembly as claimed in claim 9, wherein a through hole is formed in the chassis.

11. The backlight assembly as claimed in claim 10, wherein the lamp socket passes through the through hole and is disposed on a first surface of the chassis, and the lamp socket guide and the inverter module are disposed on a second surface opposite to the first surface.

12. A liquid crystal display comprising:
   a lamp unit; and a liquid crystal display panel displaying an image,
   wherein the lamp unit comprises:
      a lamp;
      a lamp socket having a contact portion electrically connected to an electrode of the lamp;
      a lamp socket guide for guiding a position of the lamp socket; and
      an inverter module including a substrate and an inverter mounted on the substrate to supply power to the lamp,
   wherein the lamp socket guide comprises:
      a lamp socket fastening portion for preventing a lamp socket from floating; and
      an inverter cover portion integrally combined with and formed at one side of the lamp socket fastening portion so that the combination defines a monolithic structure, wherein the inverter cover portion is structured to protect the inverter.

13. The liquid crystal display as claimed in claim 12, wherein the lamp socket fastening portion comprises:
   a base plate; and
   a lamp socket seating groove formed in the base plate to provide a space in which the lamp socket is seated.

14. The liquid crystal display as claimed in claim 12, wherein the inverter cover portion comprises:
   a cover plate; and
   a sidewall bent from the cover plate.

15. The liquid crystal display as claimed in claim 12, wherein the substrate of the inverter module is fastened to the lamp socket in a sliding manner.

16. The liquid crystal display as claimed in claim 12, wherein the substrate of the inverter module is connected to the contact portion of the lamp socket by soldering.

17. The liquid crystal display as claimed in claim 12, wherein the inverter module is disposed in the inverter cover portion of the lamp socket guide.

18. The liquid crystal display as claimed in claim 14, wherein a plurality of heat radiation holes are formed in the cover plate.

19. The liquid crystal display as claimed in claim 14, wherein the cover plate is formed with an opening portion being shaped to correspond to, and having an area at least as large as a corresponding major surface area of the inverter.

20. The liquid crystal display as claimed in claim 14, wherein a plurality of heat radiation protrusions are formed on the cover plate.

21. The liquid crystal display as claimed in claim 14, wherein a first side of the cover plate of the inverter cover portion is connected to one side of the lamp socket fastening portion, and the sidewall is formed at each of second and third sides adjacent to the first side of the cover plate.

22. The liquid crystal display as claimed in claim 21, wherein recesses are formed in the second and third sides of the cover plate, respectively.

23. The liquid crystal display as claimed in claim 12, wherein the lamp socket fastening portion is disposed between a plurality of the lamp sockets.

24. The lamp socket guide of claim 1, wherein the monolithically integrated combination of the lamp sockets receiving and fastening portion and the inverter covering portion is formed as a unitary plastic mold.

25. The lamp socket guide of claim 1, wherein the monolithically integrated combination of the lamp sockets receiving and fastening portion and the inverter covering portion is formed as a unitary metal mold.

* * * * *